J. KLEIN.
SPRING SUPPORT.
APPLICATION FILED SEPT. 15, 1917.
1,268,077.
Patented May 28, 1918.
2 SHEETS—SHEET 1.
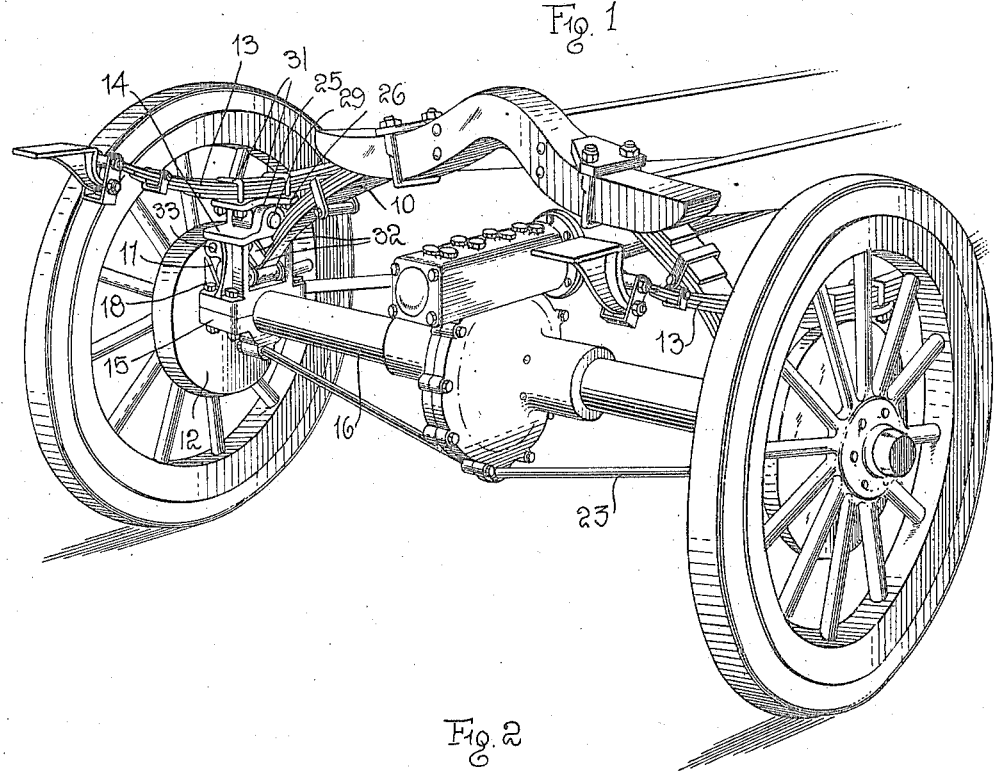
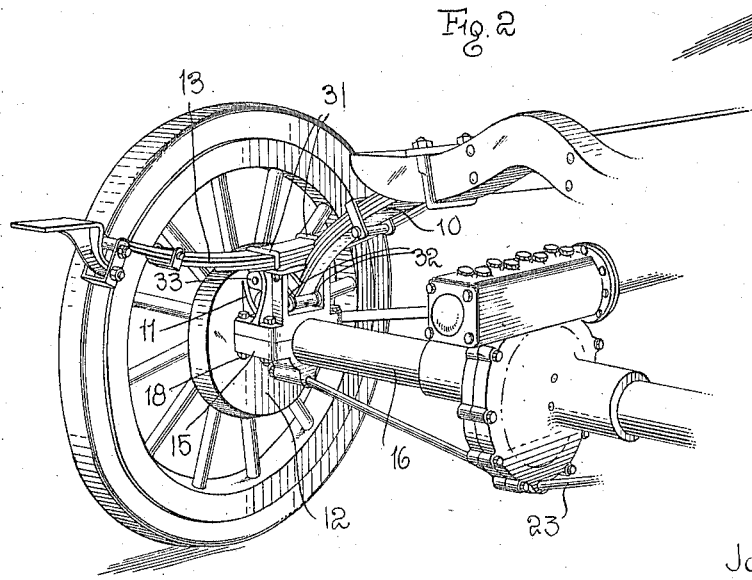
Inventor
JOHN KLEIN
By Mason Fenwick Lawrence,
Attorneys J. KLEIN.
SPRING SUPPORT.
APPLICATION FILED SEPT. 15, 1917.
1,268,077.
Patented May 28, 1918.
2 SHEETS—SHEET 2.
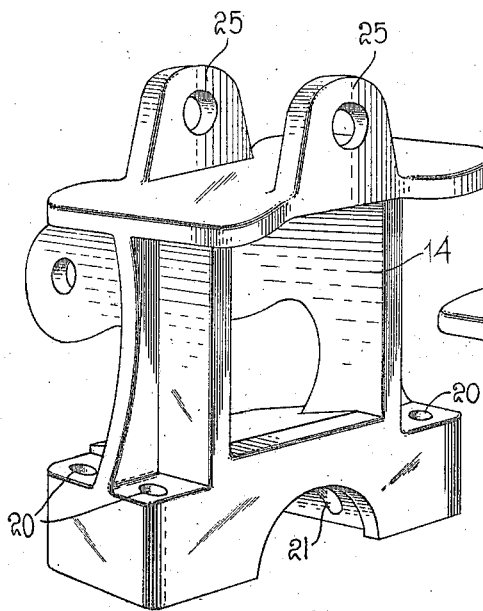
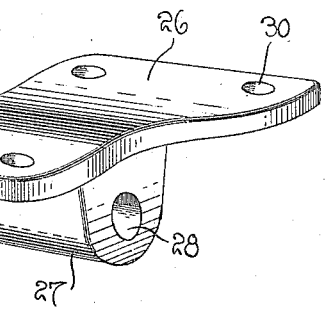
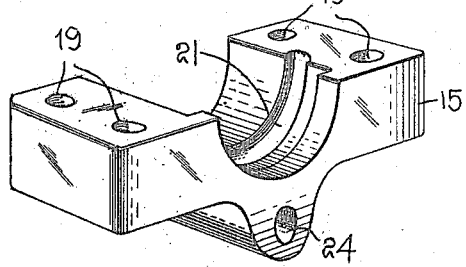
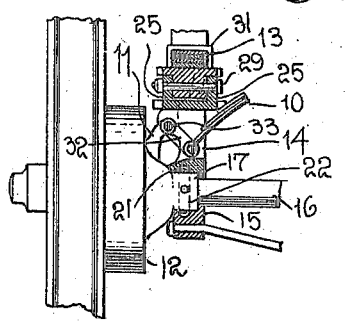
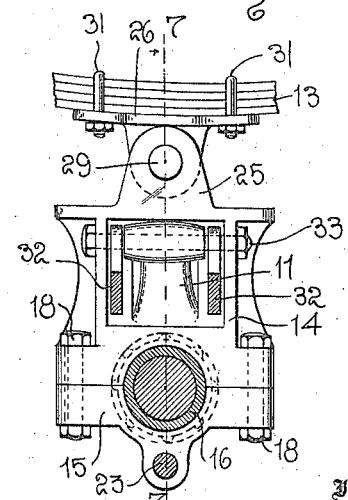
Inventor
JOHN KLEIN

UNITED STATES PATENT OFFICE.

JOHN KLEIN, OF WASHINGTON, DISTRICT OF COLUMBIA.

SPRING-SUPPORT.

1,268,077.  Specification of Letters Patent.  Patented May 28, 1918.

Application filed September 15, 1917. Serial No. 191,640.

*To all whom it may concern:*

Be it known that I, JOHN KLEIN, citizen of the United States, residing at Washington, in the District of Columbia, have invented certain new and useful Improvements in Spring-Supports; and I do hereby declare the following to be a full, clear, and exact description of the invention, such as will enable others skilled in the art to which it appertains to make and use the same.

This invention relates to spring supports for automobiles and has for its object to provide a means for supporting an auxiliary spring to convert a chassis of a well known type of automobile into a truck chassis.

A further object of the invention is to provide such a spring support for the auxiliary spring as shall operate in conjunction with the spring support ordinarily used upon such type of automobile and carrying the auxiliary spring directly from the rear axle, the regular spring remaining supported and suspended as it comes from the factory.

A further object of the invention is to provide an improved means for attaching the auxiliary spring to the support whereby the support of such springs equalize.

With these and other objects in view the invention comprises certain novel constructions, combinations and arrangements of parts as will be hereinafter more fully described and claimed.

In the drawing:

Figure 1 is a perspective view of a rear axle and associated parts of a popular type of automobile with the improved auxiliary spring support attached thereto;

Fig. 2 is a like perspective view, the spring support being modified by eliminating the cradle;

Fig. 3 is a perspective view of the top member of the spring support;

Fig. 4 is a perspective view of the bottom member of the spring support;

Fig. 5 is a perspective view of the cradle;

Fig. 6 is a view in elevation of the spring support with the rear axle and links shown in section, and Fig. 7 is a view in side elevation showing the regular casting for supporting the springs with the auxiliary spring support shown in section.

Like characters of reference designate corresponding parts throughout the several views.

Upon a particular and popular type of automobile chassis, the rear spring 10 is supported by a casting or bracket 11 integral with or carried rigidly by the bake housing 12. For converting the chassis into a truck it is desirable to add an auxiliary spring for supporting the added weight of the truck, such auxiliary spring being shown at 13 and the means for supporting such auxiliary spring 13 forms the subject matter of this application. The invention comprises a supporting member 14 having a complementary or bottom member 15, the two members being clamped about the rear axle 16 and the sleeve 17 of the brake housing by means of bolts 18, inserted through holes 19 and 20, a cut out furrow or groove 21 being provided to accommodate the rivets 22 by which the brake housing 12 is secured to the rear axle. As one of these supporting members is used upon each end of the rear axle a brace rod 23 is provided for, extending through an opening 24 in the bottom member 15.

Upon the upper portion of the support 14, ears 25 are erected between which is pivoted the cradle member shown as a whole at 26 by means of a lug 27 having an opening 28 registering with the openings of the ears 25 and with a pivot bolt 29 inserting through such registering openings. The cradle member 26 is provided with openings 30 through which clips 31 are inserted clamping the auxiliary spring 13 securely to the cradle member 26. The supporting member 14 has spaced uprights between which the regular spring 10 and the regular links 32 are suspended by means of the bolt 33 which is the regular bolt employed for that purpose, slightly elongated.

At times it is not found necessary to employ the cradle 26 in which case the device is as illustrated at Fig. 2 with the clip 31 bolted directly through the top member of the supports 14 with the ears 25 eliminated. The supporting member and the manner of supporting the same from the rear axle, however, is identical with the device as shown at Fig. 1.

It is obvious that the auxiliary supporting device may be employed upon the chassis without disturbing the normal arrangement of the parts, all of the normal parts remaining as it arrives from the factory and the auxiliary parts simply being added thereto.

What is claimed is:—

1. The combination with an automobile chassis having a spring support embodying a pivot, of an auxiliary spring support clamped about the rear axle adjacent the brake housing and connected with the normal spring support at the pivot and an auxiliary spring carried upon the auxiliary spring support.

2. The combination with an automobile chassis having a normal spring support, of an auxiliary spring support clamped about the rear axle adjacent to the brake housing and connected with the normal spring support and accommodating the action of the normal spring, a cradle carried upon the top of the auxiliary spring support and an auxiliary spring carried upon the cradle.

3. The combination with an automobile chassis having a spring support embodying a pivot, of an auxiliary spring support clamped about the rear axle and providing accommodation for the pivot and the action of the spring, a cradle pivoted upon the support, and an auxiliary spring carried by the cradle.

4. The combination with an automobile chassis having a spring support embodying a pivot, of an auxiliary spring support clamped about the rear axle adjacent the brake housing and connected with the normal spring support at the pivot, a cradle pivoted upon the support, and an auxiliary spring carried by the cradle.

In testimony whereof I affix my signature.

JOHN KLEIN.

Copies of this patent may be obtained for five cents each, by addressing the "Commissioner of Patents, Washington, D. C."